United States Patent
André et al.

(10) Patent No.: US 9,275,773 B2
(45) Date of Patent: Mar. 1, 2016

(54) DISPERSION COMPRISING METALLIC, METAL OXIDE OR METAL PRECURSOR NANOPARTICLES

(75) Inventors: Xavier André, Paris (FR); Dirk Bollen, Sint-Truiden (BE); Johan Loccufier, Zwijnaarde (BE)

(73) Assignee: Agfa-Gevaert N.V., Mortsel (BE)

( * ) Notice: Subject to any disclaimer, the term of this patent is extended or adjusted under 35 U.S.C. 154(b) by 371 days.

(21) Appl. No.: 13/996,399

(22) PCT Filed: Dec. 19, 2011

(86) PCT No.: PCT/EP2011/073226
§ 371 (c)(1),
(2), (4) Date: Sep. 25, 2013

(87) PCT Pub. No.: WO2012/084813
PCT Pub. Date: Jun. 28, 2012

(65) Prior Publication Data
US 2014/0065387 A1    Mar. 6, 2014

Related U.S. Application Data

(60) Provisional application No. 61/425,786, filed on Dec. 22, 2010.

(30) Foreign Application Priority Data

Dec. 21, 2010 (EP) ..................................... 10196244

(51) Int. Cl.
| | |
|---|---|
| H01B 1/22 | (2006.01) |
| H01B 1/02 | (2006.01) |
| B05D 5/12 | (2006.01) |
| C09D 11/52 | (2014.01) |
| C09D 11/03 | (2014.01) |
| C09D 11/326 | (2014.01) |
| C09D 17/00 | (2006.01) |
| C08L 59/00 | (2006.01) |
| C08L 71/00 | (2006.01) |
| B01F 17/00 | (2006.01) |

(52) U.S. Cl.
CPC .. *H01B 1/22* (2013.01); *B05D 5/12* (2013.01); *C08L 59/00* (2013.01); *C08L 71/00* (2013.01); *C09D 11/03* (2013.01); *C09D 11/326* (2013.01); *C09D 11/52* (2013.01); *C09D 17/006* (2013.01); *H01B 1/02* (2013.01); *B01F 17/0007* (2013.01); *Y10T 428/24917* (2015.01)

(58) Field of Classification Search
CPC .............. H01B 1/02; H01B 1/20; H01B 1/22; B05D 5/12; C08L 59/00; C08L 71/00; C09D 11/03; C09D 11/30; C09D 11/326; C09D 11/52
See application file for complete search history.

(56) References Cited

U.S. PATENT DOCUMENTS

| | | | |
|---|---|---|---|
| 4,896,250 A | 1/1990 | Sullivan | |
| 7,867,413 B2* | 1/2011 | Lee ........................ | B22F 1/0022 252/512 |
| 2006/0264518 A1 | 11/2006 | Kato et al. | |
| 2007/0154644 A1 | 7/2007 | Hwang et al. | |
| 2008/0220155 A1 | 9/2008 | Yoshizumi et al. | |
| 2009/0142482 A1 | 6/2009 | Li et al. | |
| 2009/0198009 A1* | 8/2009 | Matsuki ................. | B82Y 30/00 524/440 |
| 2009/0242854 A1* | 10/2009 | Li ......................... | C09D 11/101 252/519.33 |
| 2009/0321689 A1 | 12/2009 | Harada et al. | |
| 2010/0040846 A1* | 2/2010 | Bahnmuller ........... | C09D 11/52 428/208 |
| 2010/0059260 A1 | 3/2010 | Takemoto et al. | |
| 2010/0143591 A1 | 6/2010 | Wu et al. | |
| 2014/0329067 A1 | 11/2014 | André et al. | |
| 2015/0017405 A1 | 1/2015 | André et al. | |

FOREIGN PATENT DOCUMENTS

| | | | |
|---|---|---|---|
| EP | 0166617 | A2 | 1/1986 |
| EP | 0803551 | A2 | 10/1997 |
| EP | 1683592 | A1 | 7/2006 |
| EP | 1887056 | A1 | 2/2008 |
| EP | 2012952 | A2 | 1/2009 |
| EP | 2030706 | A1 | 3/2009 |
| EP | 2050792 | A1 | 4/2009 |
| EP | 2087490 | A1 | 8/2009 |
| EP | 2119747 | A1 | 11/2009 |
| EP | 2119767 | A1 | 11/2009 |
| EP | 2139007 | A1 | 12/2009 |
| EP | 2147733 | A1 | 1/2010 |
| EP | 2468827 | A1 | 6/2012 |
| JP | 2126511 | A | 5/1990 |
| WO | WO 2006/072959 | A1 | 7/2006 |
| WO | WO 2006/076603 | A2 | 7/2006 |
| WO | WO 2007/120756 | A2 | 10/2007 |
| WO | WO 2008/021472 | A2 | 2/2008 |
| WO | WO 2008/038867 | A1 | 4/2008 |
| WO | WO 2008/049519 | A1 | 5/2008 |
| WO | WO 2008/151066 | A1 | 12/2008 |
| WO | WO 2009/152388 | A1 | 12/2009 |

(Continued)

OTHER PUBLICATIONS

Franta, E., et al., "Functionalization of Poly(1,3-Dioxolane)," *Macromolecular Symposia*, vol. 85, No. 1, pp. 167-174 (Aug. 1994).

(Continued)

*Primary Examiner* — Mark Kopec
*Assistant Examiner* — Matthew R Diaz
(74) *Attorney, Agent, or Firm* — Leydig, Voit & Mayer, Ltd.

(57) ABSTRACT

The present invention relates to a dispersion comprising metallic, metal oxide or metal precursor nanoparticles and a polymeric dispersant, the dispersant comprising an anchor group with affinity for the metallic, metal oxide or metal precursor nanoparticles that is chemically bonded to a polymeric backbone characterized in that the dispersant has a 95 wt. % decomposition at a temperature below 300° C. as measured by Thermal Gravimetric Analysis. It further relates to metallic fluids or inks prepared from the dispersion and to the preparation of the dispersion and the metallic fluid or inks.

15 Claims, No Drawings

(56) References Cited

FOREIGN PATENT DOCUMENTS

WO  WO 2009/157393 A1  12/2009
WO  WO 2011/052966 A2  5/2011

OTHER PUBLICATIONS

Lee, Jong-Min, et al., "Effects of PVP on the formation of silver-polystyrene heterogeneous nanocomposite particles in novel preparation route involving polyol process: Molecular weight and concentration of PVP," *Materials Chemistry and Physics*, vol. 114, No. 2, pp. 549-555 (Apr. 15, 2009).

International Search Report in corresponding International Patent Application No. PCT/EP2011/073226, mailed May 7, 2012.

International Preliminary Report on Patentability in corresponding International Patent Application No. PCT/EP2011/073226, mailed Jun. 25, 2013.

* cited by examiner

DISPERSION COMPRISING METALLIC, METAL OXIDE OR METAL PRECURSOR NANOPARTICLES

CROSS-REFERENCE TO RELATED APPLICATIONS

This application is the U.S. national phase of PCT/EP2011/073226, filed Dec. 19, 2011, claiming the benefit of European Patent Application No. 10196224.7, filed Dec. 21, 2010, and U.S. Provisional Patent Application No. 61/425,786, filed Dec. 22, 2010; the disclosures of the '226, '224, and '786 applications are incorporated by reference.

FIELD OF THE INVENTION

The present invention relates to dispersions comprising metallic, metal oxide or metal precursor nanoparticles, to polymeric dispersants used in such dispersions and to metallic fluids or inks prepared from such dispersions.

BACKGROUND OF THE INVENTION

The interest in metallic nanoparticles has increased during the last decades due to their unique properties when compared to the bulk, properties of a given metal. For example, the melting point of metal nanoparticles decreases with decreasing particle size making them of interest for printed electronics, electrochemical, optical, magnetic and biological applications.

The production of stable and concentrated metallic nanodispersions that can be coated or printed, for example by inkjet printing, with a high throughput is of great interest as it enables the preparation of electronic devices at low costs.

Usually, the production of metallic nanodispersions is carried out in water or organic solvents by the polyol synthesis methodology (as disclosed in Mat. Chem. Phys. 114, 549-555), by a derivative of the polyol synthesis methodology, or by an in-situ reduction of metallic salts in the presence of various reducing agents. Such methods are disclosed in for example US2010143591, US2009142482, US20060264518 and US20080220155, EP-As 2147733, 2139007, 803551, 2012952, 2030706, 1683592, 1666172119747, 2087490 and 2010314, WOs 2008/151066, 2006/076603, 2009/152388 and 2009/157393.

Among others, the dilution of metallic nanodispersions, usually less than 1 wt. % of metallic particles, is a severe drawback. Indeed, such highly diluted metallic nanodispersions cannot directly be used to prepare a conductive coating or a printing fluid that requires at least 5 wt. % of metallic nanoparticles based on its composition. An additional concentration step of the diluted metallic nanodispersions is then necessary before it can be used in the preparation of such coating or printing fluids.

WO2006/072959 discloses the production of silver nanoparticles dispersions up to 35 wt. % in water but the method still requires additional purification and isolation steps that impart drastically their industrialization and the scope of their applications.

A metallic nanodispersion typically comprises metallic, metal oxide or metal precursor nanoparticles, a polymeric dispersant and a liquid vehicle or dispersion medium. The polymeric dispersant is a substance that promotes the formation and stabilization of a dispersion of particles in a dispersion medium. Dispersed particles may have a tendency to re-agglomerate after the dispersing operation, due to mutual attraction forces. The use of dispersants counteracts this re-agglomeration tendency of the particles. The dispersant has to meet particularly high requirements when used for coating fluids and printing inks. Non-stable dispersions may lead to irreversible phase separation causing among other the clogging of the coating or printing heads, which are usually only a few micrometers in diameter. In addition, metallic particles agglomeration and the associated blockage of the coating/printing heads has to be avoided in the standby periods of the system.

In the case of metallic nanoparticles dispersions, their tendency to re-agglomerate, to flocculate or to precipitate (leading to phase separation) is enhanced due to their high bulk density ($\rho$) when compared to other organic or inorganic particles like organic pigments ($\rho=1.2$-$2.0$ g/cm$^3$), inorganic pigments ($\rho=4.2$ g/cm$^3$ for titanium dioxide) or inorganic filler ($\rho=4.4$ g/cm$^3$ for barium sulfate). For example, the bulk densities at room temperature of silver, copper and gold are respectively 10.49, 8.94 and 19.30 g/cm$^3$.

It is thus desirable to design specific polymeric dispersants with which more stable and more concentrated metallic nanodispersions can be realized.

Polymeric dispersants typically contain in one part of the molecule so-called anchor groups, which adsorb onto the metallic particles to be dispersed. In a spatially separate part of the molecule, polymeric dispersants have polymer chains compatible with the dispersion medium (or liquid vehicle) and all the ingredients present in the final coating or printing fluids. Typical polymeric dispersants include homopolymers or random or block copolymers of various topologies and architectures (linear, graft, hyperbranched).

Metallic nanoparticles dispersions usually comprise polymeric dispersants selected from homopolymers and copolymers based on acrylic acid, methacrylic acid, vinyl pyrrolidinone, vinyl butyral, vinyl acetate or vinyl alcohol.

EP-A 2147733 discloses a method for producing a silver ink from a dispersion containing a polymeric dispersant, the dispersant comprising a hydrophilic segment and a polyalkyleneimine chain.

The metallic nanodispersions are used to coat or print metallic patterns on a substrate. Typically, after applying the patterns on the substrate, a sintering step at elevated temperatures is carried out to induce/enhance the conductivity. It has been found that the organic components of the nanodispersions, for example the polymeric dispersants, may reduce the sintering efficiency and thus the surface conductivity. For this reason, higher sintering temperatures and longer sintering times are often required to decompose the organic components.

Typical polymeric dispersants, such as those described above, are characterized by a full decomposition temperature of at least 350° C. Therefore, the patterns coated or printed with the fluids or inks comprising such polymeric dispersants require a sintering step at elevated temperatures to be sure that most of the organic components in the coated or printed layers are decomposed.

Such high sintering temperatures are not compatible with common polymer foils, such as polyethylene terephthalate (PET) or polycarbonate which have relatively low glass transition temperatures. This restricts the choice to more expensive polymers such as polyimide.

It is thus highly desirable to provide metallic, metal oxide or metal precursor nanoparticle dispersions that can be coated or printed onto a variety of substrates and sintered at a lower temperatures.

SUMMARY OF THE INVENTION

It is an object of the present invention to provide stable and concentrated dispersions of metallic, metal oxide or metal precursor nanoparticles with which conductive patterns can be formed on a variety of flexible substrates at low sintering temperatures. It is a further object of the invention to provide a preparation method for these dispersions.

These objects are realised by a dispersion comprising metallic, metal oxide or metal precursor nanoparticles and a polymeric dispersant, the dispersant comprising an anchor group with affinity for the metallic, metal oxide or metal precursor nanoparticles that is chemically bonded to a polymeric backbone characterized in that the dispersant has a 95 wt. % decomposition at a temperature below 300° C. as measured by Thermal Gravimetric Analysis.

Further advantages and embodiments of the present invention will become apparent from the following description and the dependent claims.

DETAILED DESCRIPTION OF THE INVENTION

The present invention relates to a dispersion comprising (a) metallic, metal oxide or metal precursor nanoparticles and (b) a polymeric dispersant, the dispersant comprising an anchor group with affinity for the metallic, metal oxide or metal precursor nanoparticles that is chemically bonded to a polymeric backbone, and (c) an optional liquid vehicle, characterized in that the dispersant has a 95 wt. % decomposition at a temperature below 300° C. as measured by Thermal Gravimetric Analysis.

Metallic, Metal Oxide or Metal Precursor Nanoparticles

The dispersion of the present invention comprises metallic nanoparticles, metal oxide nanoparticles or metal precursor nanoparticles.

The metallic nanoparticles comprise one or more metals in elemental or alloy form. The metal is preferably selected from the group consisting of silver, gold, copper, nickel, cobalt, molybdene, palladium, platinum, indium, tin, zinc, titanium, chromium, tantalum, tungsten, iron, rhodium, iridium, ruthenium, osmium, aluminium and lead. Metallic nanoparticles based on silver, copper, molybdene, aluminium, gold, or a combination thereof, are particularly preferred.

Other preferred nanoparticles are based on Copper Indium Gallium or Copper Indium Gallium Selenide (CIGS). Other preferred nanoparticles, based on selenides or sulfides, such as for example CdS, CdSe, ZnS, ZnSe, PbS, PbSe, CdTe, CdTeSe or PbSe may also be used.

Preferred metal oxide nanoparticles are based on indium oxide, indium tin oxide, tin oxide, titanium oxide, zirconium oxide, wolfram oxide, molybdene oxide, cadmium oxide or zinc oxide. Also doped metal oxide nanoparticles such as ZnO:Al, $SnO_2$:F or $SnO_2$:Sb may be used. Copper Indium Gallium oxides and copper oxides may also be used as precursors for Copper Indium Gallium Selenide nanoparticles.

The term "precursor" refers to the ability of converting it to the desired material by means of an additional step such as the reduction of metal oxides to metals or the selenization of Copper Indium Gallium to CIGS.

The term "nanoparticles" refers to dispersed particles having an average particle size below 100 nm at the end of the dispersion preparation. The metallic, metal oxide or metal precursor nanoparticles have an average particle size at the end of the dispersion preparation of less than 100 nm, preferably less than 50 nm, more preferably less than 10 nm.

Before the dispersion preparation step, the metal, metal precursor or metal oxide particles are typically available as powders or flakes with an average particle size often above 100 nm. Their particle size must then be lowered to the nanoparticles range during the dispersion preparation.

Polymeric Dispersant

The polymeric dispersant of the present invention is characterized by a complete decomposition at a temperature below 310° C. and by a 95 wt. % decomposition at a temperature below 300° C., more preferably below 290° C., most preferably below 280° C., as measured by Thermal Gravimetric Analysis (TGA). A 95 wt. % decomposition means that 95 wt. % of the polymeric dispersant is decomposed. The thermal decomposition may occur in 1, 2 or 3 steps. The main decomposition, i.e. at which at least 75 wt. % of the polymeric dispersant is decomposed, occurs between 100° C. and 300° C., more preferably between 125° C. and 250° C., most preferably between 150° C. and 240° C. Typically, a derivative weight loss curve is used to derive the temperature at which the main decomposition occurs. The highest peak in such a derivative weight loss curve, i.e. the main decomposition, is observed between 100° C. and 300° C., more preferably between 125° C. and 250° C., most preferably between 150° C. and 240° C.

The dispersant comprises a matrixophilic polymer backbone part, which confers the steric stabilization in the dispersion medium, and anchor groups with affinity for the metallic, metal oxide or metal precursor nanoparticles that are chemically bonded, preferably covalently bonded, to the polymer backbone. The anchor groups ensure optimal stabilization of the nanoparticles.

The polymer backbone has to ensure the 95 wt. % thermal decomposition of the polymeric dispersant at a temperature below 300° C. Therefore, the polymer backbone is preferably based on a polyacetal or polyether backbone.

As aromatic polyethers have a higher thermal stability compared to aliphatic polyethers, the polyether backbone of the dispersant preferably comprise no or only a minor amount of aromatic groups.

Particularly preferred, the polyether backbone is an aliphatic polyether backbone. A preferred example of such a polyether backbone is a polyacetal backbone.

Examples of such polyacetal/polyether backbones have the following structures,

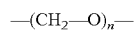

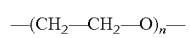

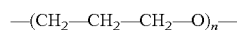

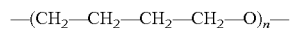

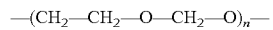

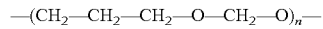

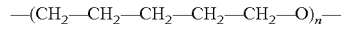

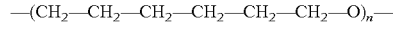

wherein is an integer between 14 and 500.

A preferred polymeric backbone is represented by Formula I,

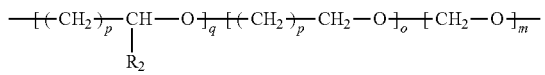

Formula I wherein m is an integer between 1 and 500, o is an integer between 0 and 340, q is an integer between 0 and 250, p is an integer between 1 and 7;

m+o+q is an integer between 14 and 500;

$R_1$ represents a $(CH_2)_p$ unit with p is an integer between 0.1 and 7 and $R_2$ represents an hydrogen, a methyl or an optionally substituted alkyl group.

Anchor groups for the metallic, metal precursor and metal oxide nanoparticles may comprise low molecular weight (MW<300) aliphatic amines or aromatic amines, thioethers, thiols, disulfides, optionally substituted aryl or aralkyl groups, 2-pyrrolidone, amide, ester, acrylic, S-containing heteroaromatic compounds, N-containing heteroaromatic compounds, optionally substituted thiiranes, thioacetals, oxathioacetals, sultams, thiophenes, benzothiophenes, cyclic and alicyclic amines, lactams, imidazolidones, oxazolidinones, hydantoins, urazoles, 2H-azirines, 3-pyrrolines, 2-pyrrolines, 1-pyrrolines, maleimides, 2-isoxazolines, 2-oxazolines, 2-imidazolines, pyrazolines, pyrroles, imidazoles, benzimidazoles, pyrazoles, indazoles, 1,2,3-triazoles, 1,2,3-benzotriazoles, 1,2,4-triazoles, tetrazoles, 1-substituted tetrazoles, 5-substituted tetrazoles, 1,5-disubstituted tetrazoles, optionally substituted imidazol-2-ones, benzimidazol-2-ones, 1,3-oxazoles, benzoxazoles, isoxazoles, 1,3-thiazoles, benzothiazoles, 1,3,4-oxadiazoles, 1,2,4-oxadiazoles, 1,3,4-thia-diazoles, indoles, oxindoles, indolines, carbazoles, azaindoles, isoindoles, indolizines, indolizinones, pyridines, dihydropyridines, 2-pyridones, pyrimidines, 1,3,5-triazines, quinolines, tetrahydroquinolines, 1,2-dihydroquinolines, isoquinolines, 3,4-dihydroisoquinolines, 1,8-napthyridines, quinazolines, 4-quinolones, 1,3-imidazoles, thioamides, morpholine derivatives, piperazine, triazaindolizines, or nucleic acid derivatives such as adenine, guanine, cytosine, thymine, uracile, or a combination thereof.

Preferably, the anchor groups comprise a S and/or N containing heteroaryl.

More preferably, the anchor groups are selected from the group of heteroaryls according to Formulae II, III, IV or V.

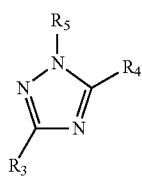

Formula II

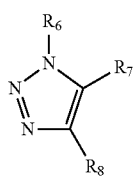

Formula III

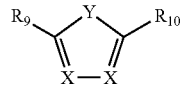

Formula IV

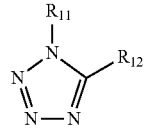

Formula V wherein $R_3, R_4, R_7, R_8, R_9, R_{10}$, and $R_{12}$ independently represent an halogen, an optionally substituted thiol, an hydroxyl, a carboxylic acid, an aldehyde, an ester, an amide, a primary amine, a secondary amine, a tertiary amine, an optionally substituted alkyl, aryl, aralkyl or alkylene group;

$R_7$ and $R_8$ can be optionally linked and form a ring structure;

$R_5, R_6, R_{11}$ represent independently an halogen, an optionally substituted thiol, a carboxylic acid, a primary amine, a secondary amine, a tertiary amine, an optionally substituted alkyl, aryl or aralkyl group;

X independently represents a —N—, a —CH—, or a —C($CR_{13}$)— and where $R_{13}$ represents a methyl, an optionally substituted alkyl, aryl or aralkyl group and where X can optionally be linked to $R_9$ or $R_{10}$ and form a ring structure;

Y represents oxygen, sulfur, or —$NR_{14}$— wherein $R_{14}$ represents a methyl or an optionally substituted alkyl, aryl or aralkyl group.

Particularly preferred anchor groups include 2,5-dimercapto-1,3,4-thiadiazole, 1-(2-dimethylamino-ethyl)-5-mercapto-tetrazole, 5-Mercapto-1-methyltetrazole, 3-amino-5-mercapto-1,2,4-triazole and 1-(2-dimethylamino-ethyl)-5-mercapto-tetrazole.

The polymeric dispersants according to the present invention are preferably produced by any of the following methods:
  a ring-opening polymerization, a ring-opening copolymerization or any other polymerization or copolymerization of cyclic acetals or oxiranes in the presence of the anchor group;
  a post-functionalization of a polyether or polyacetal precursor by post-polymerization procedures including the quenching or derivatization with the anchor group molecules or any molecule bearing the anchor group moiety, as described in Macromol. Symp. 1994, 85, 167-174.

When carrying out the polymerization in the presence of the anchor group, the first method described above, the anchor groups may be chemically bonded to one or both ends (i.e. the telechelic positions) of the polymeric backbone or may be incorporated into the polymeric backbone. When carrying out a post-functionalization, the second method described above, the anchor groups will preferably be chemically bonded to one or both ends of the polymeric backbone.

The anchor groups according to Formulae II to V may be chemically bonded to the polymer backbone through for example the N-atoms of the heterocycles or the $R_3$ to $R_{12}$ substituents.

A particularly preferred polymeric dispersant comprises an anchor group with affinity for metallic, metal oxide or metal precursor nanoparticles according to Formula II, III, IV or V, or a combination thereof, that is chemically bonded to a polymeric backbone according to Formula V.

Preferably, this particularly preferred polymeric dispersant is prepared by a reaction between:
a) 90 to 99.4 mol % of a monomer represented by Formula VI, VII or VIII, or a combination thereof;

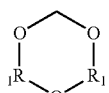

Formula VI

Formula VII

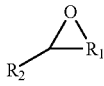

Formula VIII wherein
$R_1$ represents a $(CH_2)_p$ unit with p is an integer between 1 and 7 and $R_2$ represents an hydrogen, a methyl or an optionally substituted alkyl group;
b) 0.1 to 10 mol % of a metallic anchor group according Formula II, III, IV or V, or a combination thereof;
c) 0.1 to 0.5 mol % of a polymerization initiator selected from the groups consisting of a proton acid, a Lewis acid and an oxonium compound, or of an anionic initiator selected from the group consisting of an alcoholate and an organanometallic compound.

The mol % referred to above is based on the feed mixture.

Suitable polymerization initiators are trifluoromethane-sulfonic acid, methanesulfonic acid, perchloric acid, acetic anhydride, boron trifluoride etherate, boron trifluoride methyl etherate, boron trifluoride diethyl etherate, boron trifluoride dibutyl etherate, boron trifluoride methyl tert-butyl etherate, triethyloxonium tetrafluoroborate, triethyloxonium hexachloroantimonate, triethyloxonium hexafluorophosphate, antimony salts such as antimony chloride, diethylaluminum chloride, ethyl aluminum dichloride, trialkyl aluminum, metal halides such as aluminum chloride, zinc chloride, titanium tetrachloride, sodium alkoxide, potassium alkoxide, alkyl or aryl lithium, alkyl or aryl sodium, alkyl or aryl potassium, alkyl magnesium bromide, sodium naphthalene, aluminum alkoxide, magnesium alkoxide, beryllium alkoxide, or ferric alkoxide.

The polymeric dispersant according to the present invention has an average numerical molecular weight Mn of less than 15000 Da, more preferably less than 8000 Da. In an even more preferred embodiment, the average numerical molecular weight Mn is comprised between 1500 and 6000 Da.

Upon completion of the reaction described above, free anchor groups, i.e. anchor groups that are not chemically bonded to the polymer backbone, may be present in the resulting reaction product. Such a reaction product, i.e. polymeric dispersant according to the present invention and free anchor groups may be used as such to prepare to nanodisperions according to the present invention when the amount of free anchor groups is not too high.

In a preferred embodiment less than 10 mol % of free anchor groups is present in the reaction product.

Dispersion Media

The optional dispersion medium used in the nanoparticle dispersion of the present invention is a non-aqueous liquid. The dispersion medium may consist of an organic solvent or a combination of organic solvents. Suitable organic solvents include alcohols, aromatic hydrocarbons, ketones, esters, aliphatic hydrocarbons, higher fatty acids, carbitols, cellosolves, and higher fatty acid esters. Suitable alcohols include methanol, ethanol, propanol and 1-butanol, 1-pentanol, 2-butanol, t.-butanol. Suitable aromatic hydrocarbons include toluene, and xylene. Suitable ketones include methyl ethyl ketone, methyl isobutyl ketone, 2,4-pentanedione and hexafluoroacetone. Also glycol, glycolethers, N-methylpyrrolidone, N,N-dimethylacetamid, N,N-dimethylformamid may be used. In a preferred embodiment, the use of 1-methoxy-2-propanol, methanol, ethanol and isopropanol is particularly preferred.

Preparation Nanoparticles Dispersion

Nanoparticles dispersions are prepared by dispersing the metal(s), the metal oxide(s) or the metal precursor(s) in the presence of the polymeric dispersant in the dispersion medium. Dispersing methods include precipitating, mixing or milling or a combination thereof. The experimental conditions such as temperature, process time, energy input, etc. depend on the methodology chosen. The dispersion process can be carried out in a continuous, batch or semi-batch mode.

Mixing apparatuses may include a pressure kneader, an open kneader, a planetary mixer, a dissolver, a high shear stand mixer, and a Dalton Universal Mixer. Suitable milling and dispersion apparatuses are a ball mill, a pearl mill, a colloid mill, a high-speed disperser, double rollers, a bead mill, a paint conditioner, and triple rollers. Many different types of materials may be used as milling media, such as glasses, ceramics, metals, and plastics. The dispersions may also be prepared using ultrasonic energy.

The term "nanoparticles" refers to dispersed particles having an average particle size below 100 nm at the end of the dispersion preparation. Before the dispersion preparation step, the metallic, metal precursor or metal oxide particles are typically available as powders, flakes, particles or aggregated particles. When their average size is above 100 nm, the dispersion step includes necessarily a down-sizing step including the actions of milling or de-aggregating until the particles size is lowered to the nanoparticles range. The conversion of metal precursor(s) or metal oxide(s) to metal(s) can be concomitant to the down-sizing step.

In a preferred embodiment, the nanoparticles dispersions of the present invention are prepared by an in-situ reduction under mixing of a metal precursor, a metal oxide, a metal salt or a combination thereof, in the presence of a reducing agent and the polymeric dispersant according the present invention in the dispersion medium.

In a preferred embodiment, the dispersion is a low viscous liquid comprising at least 1 wt. %, more preferably at least 5 wt. %, of metallic, metal oxide or metal precursor nanoparticles.

The weight ratio nanoparticles/polymeric dispersant is at least 1.0, more preferably between 3.0 and 9.0.

In another preferred embodiment, the dispersion is substantially solvent-free, i.e. less than 10 wt. %, preferably less than 5 wt. % of solvent. Such a substantially solvent-free dispersion is obtained as a high viscous homogenous paste after evaporation of the dispersion medium. The solvent-free dispersion preferably comprises between 50 and 90 wt. % of metal, metal oxide or metal precursor nanoparticle's. More preferably, the solvent-free dispersion comprises at least 75 wt. % of nanoparticles.

The high viscous paste can be re-dispersed in water, in an organic solvent or in a combination thereof resulting in a low viscous dispersion which can then be used as for example a printing fluid. The re-dispersing step may be carried out by magnetic or mechanical stirring or by mixing. The size of the nanoparticles does not vary during the re-dispersing step. Realizing a stable high viscous paste that can be re-dispersed is an advantage for storing and transporting. In addition, the high viscous past can be re-dispersed in a variety of solvent, even water, resulting in an increased flexibility to choose the optimal solvent for a particular application.

Metallic Printing Fluids—Coating Solutions

The low viscous dispersions according to the present invention may be directly used as a coating solution or printing fluid. However, to optimize its coating or printing properties and depending on the application for which it is used, extra solvents and/or additives such as protonic acids, reducing agents, salts, wetting/levelling agents, rheology modifiers, or adhesion agents or tackifiers may be added to the low viscous nanoparticles dispersion or the re-dispersed paste after re-dispersion in a suitable solvent.

The thin layers or patterns printed or coated from the metallic fluids or inks of the present invention can be rendered conductive at lower sintering temperatures compared to those obtained with conventional metallic fluids or inks. Therefore, conductive thin layers or patterns made from the metallic fluids or inks of the present invention can be coated or printed on flexible substrates that can not withstand thermal treatment at high temperature, such as for example PET.

Metallic layers or patterns may be realized by an inkjet method. The viscosity of the printing fluid measured at jetting temperature is preferably between 5 and 20 mPa·s, more preferably between 5 and 12 mPa·s.

The metallic layers or patterns may also be realized by any conventional printing techniques such as flexography, offset, gravure or screen printing or by any conventional coating technique such as spray coating, blade coating, slot die coating After the layers or patterns are applied on the substrate, a sintering step is carried out. During this sintering step, solvents evaporate, organic components decompose and the metallic particles sinter together. Once a continuous percolating network is formed between the metallic particles, the layers or patters become conductive. Conventional sintering is carried out by applying heat. The sintering temperature is of course dependent on the substrate used but is preferably below 300° C., more preferably below 250° C., most preferably below 200° C. However, instead of or in addition to the conventional sintering by applying heat, alternative sintering methods such as exposure to an Argon laser, to microwave radiation, to UV radiation or to low pressure Argon plasma, photonic curing, plasma, electron beam or pulse electric current sintering may be used.

The conductive layers or patterns may be used in various electronic devices or parts of such electronic devices as for example organic photo-voltaics (OPV's), inorganic photo-voltaics (c-Si, a-Si, CdTe, CIGS), OLED displays, OLED lighting, inorganic lighting, RFID's, organic transistors, thin film batteries, touchscreens, e-paper, LCD's, plasma, or electromagnetic shielding.

EXAMPLES

Materials

All materials used in the following examples were readily available from standard sources such as ALDRICH CHEMICAL Co. (Belgium) and ACROS (Belgium) unless otherwise specified.

PVP 15K, a poly(vinyl pyrrolidone) from BASF AG having a molecular weight of 15000 Da.

PVP 90K is a poly(vinyl pyrrolidone) from BASF AG having a molecular weight of 90000 Da.

PAA, a poly(acrylic acid) from ALLIED COLLOIDS MANUFACTURING CO LTD having a molecular weight of 12000 Da.

DISPERBYK 190 (D190), a poly(acrylate/acrylic) block copolymer (40 wt. % in water) from BYK CHEMIE GMBH.

PVA, a 8000 Da poly(vinylalcohol/vinylacetate; 60/40 mol %) copolymer from SHAWINIGAN.

Silver nitrate ($AgNO_3$) is manufactured by AGFA GEVAERT N.V.

Silver oxide ($Ag_2O$) is prepared by the precipitation of silver nitrate in an alkaline aqueous solution of sodium hydroxide (33 wt. %) followed by filtration and drying. Silver oxide is commercially available from ALDRICH.

AgOAc, silver acetate from ALDRICH.

Ascorbic acid, from UCB PFIZER MERCK.

DMDT, 2,5-dimercapto-1,3,4-thiadiazole from ROBINSON BROTHERS LTD.

DMAEMT, 1-(2-dimethylamino-ethyl)-5-mercapto-tetrazole from DYNAMITE NOBER AG.

DCM, dichloromethane or methylenechloride ($CH_2Cl_2$) from ACROS.

MOP, 1-methoxy-2-propanol from ACROS.

Trifluoromethanesulfonic acid from ALDRICH.

n-decane from ALDRICH.

PDXL, a polydioxolane synthesized by the ring opening polymerization of 1,3-dioxolane in dichloromethane in the presence of ethylene glycol and trifluoromethanesulfonic acid at 23° C. for 24 hours.

Measurement Methods

Thermogravimetric analysis (TGA) of the polymeric dispersants were performed by using a TGA Q500 V6.7 instrument (Build 203) with Hi-Res—Dynamic method (Hi-Res sensitivity=2.0, resolution=5.0). The temperature range was 25 to 500° C. with a maximum heating ramp of 50° C./minute. The heating rate was controlled by the evaporation rate of the sample that allowed the high resolution mode. Td (95%) represents the measured temperature for 95 wt. % of decomposition (or at which the char yield is 5 wt. %; the char yield is the residual wt. % after decomposition)

The polymeric dispersant stability was evaluated by comparing their Size Exclusion Chromatography traces as well as their Mn and Mz is values after at least one month of storage at 23° C. Stable polymeric dispersants have a decrease in both Mn and Mz of less than 5%.

The number average particle size of the nanoparticles was calculated from Transmission Electronic Microscopy (TEM) images. An aliquot of the dispersion diluted to 0.02 wt. % in MOP was put on a carbon-coated Cu-TEM grid (Agar Scientific, UK), dried and analyzed with a CM200 TEM (FEI) instrument operated at 200 kV.

Example 1

This example illustrates the preparation of the Polymeric Dispersants (PD) according to the present invention.

Preparation of Polymeric Dispersant PD-01

414.4 g of 1,3-dioxolane was dissolved in 0.43 l of DCM in a 2 l three-neck round-bottom flask and stirred at room temperature under nitrogen atmosphere. 33.6 g of DMDT was added to the flask. After 10 minutes of constant stirring, 1.6 ml of trifluoromethanesulfonic acid was added to the reaction mixture and stirred for 20 hours at 23° C. 3.5 ml of triethylamine was added to the reaction mixture and stirred for an additional 4 hours at 23° C. The reaction mixture was evaporated under reduced pressure at 35° C. and dried in a vacuum oven at 35° C. 358.4 g of polymeric dispersant PD-01 was recovered as a yellowish viscous liquid (yield=80%).

Preparation of Polymeric Dispersant PD-02

500 g of 1,3-dioxolane was dissolved in 377 g of DCM in a 2 l three-neck round-bottom flask and stirred at room temperature under nitrogen atmosphere. 70.4 g of DMDT and 10 g of n-decane was added to the flask. After 10 minutes of constant stirring, 2.5 g of trifluoromethanesulfonic acid was added to the reaction mixture and stirred for 4 hours at 23° C. 2.6 g of triethylamine was added to the reaction mixture that was then evaporated under reduced pressure at 35° C. and dried in a vacuum oven at 35° C. 506 g of polymeric dispersant PD-02 was recovered as a yellowish viscous liquid (yield=88.7%).

Synthesis of Polymeric Dispersant PD-03

1000 g of 1,3-dioxolane was dissolved in 994 g of DCM in a 5 l three-neck round-bottom flask and stirred at room temperature under nitrogen atmosphere. 27.4 g of DMDT was added to the flask. After 10 minutes of constant stirring, 2.5 g of trifluoromethanesulfonic acid was added to the reaction mixture and stirred for 24 hours at 23° C. 5.1 g of triethylamine was added to the reaction mixture whereupon the mixture was transferred dropwise to 6 l of cold n-hexane under mechanical stirring. The precipitated product was filtrated over Büchner and dried in a vacuum oven at 35° C. 885 g of polymeric dispersant PD-03 was recovered as a white-yellowish powder (yield=86%).

Synthesis of Polymeric Dispersant DP-04

868 g of 1,3-dioxolane was dissolved in 886 g of DCM in a 2 l three-neck round-bottom flask and stirred at room temperature under nitrogen atmosphere. 70.4 g of DMDT and 10 g of n-decane was added to the flask. After 10 minutes of constant stirring, 2.2 g of trifluoromethanesulfonic acid was added to the reaction mixture and stirred for 24 hours at 23° C. 6.1 g of triethylamine were added to the reaction mixture. ⅔ of the reaction mixture was precipitated into 6 l of cold n-hexane under mechanical stirring. The precipitated product was filtrated over Büchner and dried in a vacuum oven at 23° C. 490 g of polymeric dispersant PD-04 was recovered as a white-yellowish powder (yield=78%).

The molecular weight (Mn, Mw, Mw/Mn) of the polymeric dispersants DP-01 to DP-04 was determined by size exclusion chromatography using dimethyl acetamide/0.21 wt. % LiCl/0.63 wt. % acetic acid as an eluent and 3 mixed-B columns which were calibrated against linear polystyrene standards. The results are given in Table 1.

TABLE 1

| Polymeric Dispersant | Mn | Mz | Mw/Mn |
|---|---|---|---|
| DP-01 | 5.283 | 8.020 | 1.23 |
| DP-02 | 4.461 | 6.264 | 1.19 |
| DP-03 | 8.533 | 16.585 | 1.46 |
| DP-04 | 5.443 | 8.502 | 1.26 |

Example 2

This example illustrates the thermal decomposition at low temperatures of the Polymeric Dispersants of the present invention (DP-01 to DDP-04) when compared to representative prior art polymeric dispersants (COMP-01 to COMP-05). In Table 2, the temperature at which 95 wt. % of the polymeric dispersants are decomposed (Td (95%) as measured with TMA) is given.

TABLE 2

| Polymeric Dispersant | Td (95%)° C. |
|---|---|
| PD-01 (INV) | 276 |
| PD-02 (INV) | 277 |
| PD-03 (INV) | 235 |
| PD-04 (INV) | 270 |
| PDXL (COMP) | 135 |
| PVP 15K (COMP) | 475 |
| PVP 90K (COMP) | 400 |
| PVA (COMP) | 430 |
| DISPERBYK 190 (COMP) | 360 |

From Table 2, it is clear that the Td (95%) of all inventive polymeric dispersants is below 300° C. while the Td (95%) of the comparative dispersants are well above 300° C. Only PDXL is characterized by a low Td (95%), but it is impossible to prepare stable dispersions with PDXL due to the absence of anchor groups (see Table 5).

Example 3

This example illustrates the storage stability of the Polymeric Dispersants of the present invention (PD-01 to PD-04). The polymeric dispersant were stored under normal conditions at 23° C. during 1 to 3 months. The Mn and Mz values of the dispersants after storage were then compared with the original values (given as a % loss in Table 3).

TABLE 3

| Polymeric Dispersant | Stored (months) | % Loss (Mn) | % Loss (Mz) |
|---|---|---|---|
| PD-01 (INV) | 3 | −5.0 | −4.7 |
| PD-02 (INV) | 2 | −4.3 | −3.4 |
| PD-03 (INV) | 3 | −2.0 | 0 |
| PD-04 (INV) | 1 | −1.0 | −1.0 |

From Table 3, it is clear that despite their low decomposition temperature (Td (95%)), the polymeric dispersants of the present invention PD-01 to PD-04 have a sufficient shelf-life under normal storage conditions.

Example 4

This example illustrates the advantages for preparing stable Metallic NanoParticles Dispersions (MNPD) by using the thermally cleavable polymeric dispersant of the present invention. All MNPD's comprise silver metallic nanoparticles. They are prepared by reduction of a silveroxide (MNPD-3 to MNPD-6) or silver acetate (MNPD-1 and 2, MNPD-7 to MNPD-18).

Preparation of Inventive MNPD-01 and MNPD-02

11.3 g of PD-01 was dissolved in 900 g of MOP in a 2 l three-neck round-bottom flask equipped with a mechanical stirrer and a thermometer. 78 g of triethylamine was added when the reaction mixture temperature reached 60° C. 34.5 g of formic acid was added dropwise over 30 minutes followed by the dropwise addition of silver acetate (37.5 g over 1 hour). The reaction mixture was stirred for 20 additional minutes at 80° C. It was then evaporated under reduced pressure at 50° C. The black viscous paste was dissolved in 0.75 l of DCM and washed twice with 0.75 l of deionized water. The organic phase was evaporated under reduced pressure at 40° C. 30.5 g (yield=86%) of a homogeneous black paste was produced with a composition Ag/PD-01 of 68/32 wt:wt.

The preparation of inventive metallic dispersions MNPD-02 is similar to the preparation of MNPD-01 by using 2.51 g of PD-01, 7.67 g of formic acid, 8.33 g of silver acetate and 125 g of MOP and no triethylamine.

Preparation of Inventive MNPD-03

6 g of silver oxide and 1.9 g of PD-02 were stirred in 29.8 g of MOP (grey suspension) in a 125 ml reactor equipped with a thermometer. 1.95 ml of formic acid was added to the reaction mixture at 40° C. by using an automated syringe (flow=0.1 ml/min). Without further purification, the solvent was evaporated under reduced pressure at 40° C. 7.5 g of a homogeneous black paste was produced with a composition Ag/PD-02 of 75/25 wt/wt.

Preparation of Inventive MNPD-04 and MNPD-05

MNPD-04 was prepared by stirring 4 g of silver oxide and 1.9 g of PD-03 in 106 g of MOP (grey suspension) for 30 minutes at 65° C. in a 250 ml flask equipped with a thermometer. 1.6 g of formic acid was added dropwise and further stirred at 65° C. for 1 hour. Without further purification, the solvent was evaporated under reduced pressure at 40° C. 5.7 g of a homogeneous black paste was produced with a composition Ag/PD-03 of 67/33 wt:wt.

MNPD-05 was synthesized as described above for MNPD-04 but using 3.17 g of PD-03 instead of 1.9 g. 6.9 g of a homogeneous black paste was produced with a composition Ag/PD-03 54/46 wt/wt.

Preparation of Inventive MNPD-06

4 g of silver oxide and 1.2 g of PD-04 in 94.4 g of MOP (grey suspension) was stirred for 30 minutes at 40° C. in a 125 ml reactor equipped with a thermometer. 1.3 ml of formic acid was added to the reaction mixture at 40° C. by using an automated syringe (flow=0.2 ml/min). After complete addition of the formic acid, the reaction mixture was further stirred at 40° C. for one additional hour. Without further purification, the solvent was evaporated under reduced pressure at 40° C. 5.0 g of a homogeneous black paste was produced with a composition Ag/PD-04 of 75/25 wt/wt.

Preparation of Comparative MNPD-07 to MNPD-13 and MNPD-15

2.51 g of dispersant (see table 4), 17.3 g of triethylamine and 7.67 g of formic acid were stirred at room temperature in 125 ml of MOP in a 0.25 l three-neck round-bottom flask equipped with a thermometer under nitrogen atmosphere. When the reaction mixture temperature reached 60° C., 8.3 g of silver acetate was added dropwise over 30 minutes. The reaction mixture was stirred for 20 additional minutes at 80° C.

Preparation of Comparative MNPD-14

MDPD-14 was prepared as described above for MDPD-07 but by using 0.32 g of DMDT as dispersant.

Preparation of Comparative MNPD-16

MNPD-16 was synthesized as described above for MNPD-07 but by using 4.15 g of silver acetate instead of 8.3 g and 1.25 g of PAA as dispersant.

Preparation of Comparative MNPD-17

MNPD-17 was produced according to EP-A 2030706. 8.0 g of silver acetate was added dropwise to an aqueous solution of PVP15K (8 g) at 50° C. The reaction mixture was subsequently stirred at 95° C. for 45 minutes. 8.8 g of ascorbic acid was added to the solution at 35° C. under constant stirring. The total amount of water was 1570 g.

Preparation of Comparative MNPD-18

MNPD-18 was produced according to EP-A 2119747. 8 g of silver nitrate, 0.35 g of Disperbyk 190 (D190) and 1.88 g of soda were stirred in water for 10 minutes before the addition of 14.10 g of formaldehyde in water. The total water amount was 1800 g. The reaction mixture turned black instantaneously and was heated to 60° C. under constant stirring for 30 minutes.

TABLE 4

| Nanoparticles dispersion | Dispersant | wt. % Ag particles | wt. % Ag particles/ wt. % dispersant | Solvent |
|---|---|---|---|---|
| MNPD-01 (INV) | PD-01 | 2.7 | 2.2 | MOP |
| MNPD-02 (INV) | PD-01 | 4.2 | 2.2 | MOP |
| MNPD-03 (INV) | PD-02 | 18.8 | 2.2 | MOP |
| MNPD-04 (INV) | PD-03 | 4.8 | 2.2 | MOP |
| MNPD-05 (INV) | PD-03 | 4.2 | 2.2 | MOP |
| MNPD-06 (INV) | PD-04 | 4.0 | 2.2 | MOP |
| MNPD-07 (COMP) | PVP15K | 4.3 | 2.2 | MOP |
| MNPD-08 (COMP) | PVP90K | 4.3 | 16.9 | MOP |
| MNPD-09 (COMP) | PAA | 4.3 | 2.2 | MOP |
| MNPD-10 (COMP) | D190 | 4.3 | 2.2 | MOP |
| MNPD-11 (COMP) | PVA | 4.3 | 0.65 | MOP |
| MNPD-12 (COMP) | PDXL | 4.3 | 36.3 | MOP |
| MNPD-13 (COMP) | DMDT | 4.3 | 2.2 | MOP |
| MNPD-14 (COMP) | DMDT | 4.3 | 2.2 | MOP |
| MNPD-15 (COMP) | PDXL + DMDT (4/1 wt:wt) | 4.3 | 3.0 | MOP |
| MNPD-16 (COMP) | PAA | 2.2 | 2.0 | water |
| MNPD-17 (COMP) | PVP15K | 0.33 | 1.2 | water |
| MNPD-18 (COMP) | D190 | 0.28 | 3.0 | water |

Evaluation and Results

The dispersions were evaluated during the dispersion preparation. The results are given in Table 5. "OK" means that no flocculation, precipitation or jellification of the dispersion was observed during the preparation. "FLOC" means that flocculation of the dispersion was observed. Flocculated dispersions were not further evaluated.

The re-dispersibility of the metallic pastes was evaluated in methanol, MOP, ethylene glycol and diethylene glycol diethyl ether.

TABLE 5

| MNPD | Dispersion state | Physical state after isolation | Re-dispersability |
|---|---|---|---|
| MNPD-01 (INV) | OK | Homogeneous paste | OK |
| MNPD-02 (INV) | OK | Homogeneous paste | OK[1] |
| MNPD-03 (INV) | OK | Homogeneous paste | OK |
| MNPD-04 (INV) | OK | Homogeneous paste | OK |
| MNPD-05 (INV) | OK | Homogeneous paste | OK |
| MNPD-06 (INV) | OK | Homogeneous paste | OK |
| MNPD-07 (COMP) | FLOC | Black powder | Not evaluated |
| MNPD-08 (COMP) | FLOC | Not evaluated | Not evaluated |
| MNPD-09 (COMP) | FLOC | Not evaluated | Not evaluated |
| MNPD-10 (COMP) | FLOC | Not evaluated | Not evaluated |
| MNPD-11 (COMP) | FLOC | Not evaluated | Not evaluated |
| MNPD-12 (COMP) | FLOC | Not evaluated | Not evaluated |

TABLE 5-continued

| MNPD | Dispersion state | Physical state after isolation | Re-dispersability |
|---|---|---|---|
| MNPD-13 (COMP) | Unstable suspension | Black powder | NO |
| MNPD-14 (COMP) | Unstable suspension | Black powder | NO |
| MNPD-15 (COMP) | Unstable suspension | Non homogeneous paste | NO |
| MNPD-16 (COMP) | FLOC | Not evaluated | Not evaluated |
| MNPD-17 (COMP) | FLOC | Not evaluated | Not evaluated |
| MNPD-18 (COMP) | OK | Difficult isolation | Only in water |

[1] the average particle size of the Ag particles after redispersion, as measured with TEM, was 9 nm.

From Table 5, it is clear that only the inventive dispersions are stable during the whole process, even with a concentration of metallic nanoparticles higher than 1 wt. %. These dispersions can enter the composition of a coating fluid or printing ink without further purification or isolation procedures.

Furthermore, only the inventive dispersions exhibit the ability to be isolated in a straightforward manner to a universal homogeneous substantially solvent-free viscous paste that is re-dispersible in solvents without causing irreversible re-aggregation of the produced nanoparticles.

The invention claimed is:

1. A dispersion comprising metallic, metal oxide or metal precursor nanoparticles, a polymeric dispersant and an optional dispersion medium, the dispersant comprising an anchor group with affinity for the metallic, metal oxide or metal precursor nanoparticles that is chemically bonded to a polymeric backbone wherein the dispersant has a 95 wt % decomposition at a temperature below 300° C. as measured by Thermal Gravimetric Analysis, wherein the anchor group is according to Formula II, III, IV, or V, Formula II Formula III Formula IV Formula V wherein $R_3$, $R_4$, $R_7$, $R_8$, $R_9$, $R_{10}$, and $R_{12}$ independently represent a halogen, an optionally substituted thiol, a hydroxyl, a carboxylic acid, an aldehyde, an ester, an amide, a primary amine, a secondary amine, a tertiary amine, an optionally substituted alkyl, aryl, aralkyl or alkylene group;

$R_7$ and $R_8$ can be optionally linked and form a ring structure;

$R_5$, $R_6$, and $R_{11}$ represent independently a halogen, an optionally substituted thiol, a carboxylic acid, a primary amine, a secondary amine, a tertiary amine, an optionally substituted alkyl, aryl or aralkyl group;

X independently represents a —N—, a —CH—, or a —C($CR_{13}$)— and where $R_{13}$ represents a methyl, an optionally substituted alkyl, aryl or aralkyl group and where X can optionally be linked to $R_9$ or R and form a ring structure; and Y represents oxygen, sulfur, or —$NR_{14}$—, wherein $R_{14}$ represents a methyl, an optionally substituted alkyl, aryl or aralkyl group.

2. The dispersion according to claim 1, wherein the polymeric backbone of the dispersant is an aliphatic polyether backbone.

3. The dispersion according to claim 1, wherein the polymeric backbone is selected from —$(CH_2—O)_n$—

—$(CH_2—CH_2—O)_n$—

—$(CH_2—CHCH_3—O)_n$—

—$(CH_2—CH_2—CH_2—O)_n$—

—$(CH_2—CH_2—CH_2—CH_2—O)_n$—

—$(CH_2—CH_2—O—CH_2—O)_n$—

—$(CH_2—CH_2—CH_2—O—CH_2—O)_n$—

—$(CH_2—CH_2—CH_2—CH_2—CH_2—O)_n$—

—$(CH_2—CH_2—CH_2—CH_2—CH_2—CH_2—O)_n$—

—$(CH_2—CH_2—CH_2—CH_2—O—CH_2—O)_n$— wherein n is an integer between 14 and 500.

4. The dispersion according to claim 1, wherein the polymeric backbone is according to Formula I, Formula I $$\underset{}{\text{—}}[(CH_2)_p\text{—}CH\underset{R_2}{|}\text{—}O]_q[(CH_2)_p\text{—}CH_2\text{—}O]_o[CH_2\text{—}O]_m\text{—}$$

wherein m is an integer between 1 and 500, o is an integer between 0 and 340, q is an integer between 0 and 250, p is an integer between 1 and 7, m+o+q is an integer between 14 and 500, $R_2$ represents hydrogen, methyl or an optionally substituted alkyl group.

5. The dispersion according to claim 1, wherein the average numerical molecular weight of the polymeric dispersant is between 1500 and 6000 Da.

6. The dispersion according to claim 1, comprising at least 1 wt % of metallic, metal oxide or metal precursor nanoparticles.

7. A homogeneous paste prepared by evaporating substantially all of a dispersion medium of the dispersion as defined in claim 1 and comprising at least 75 wt % of metallic, metal oxide or metal precursor nanoparticles.

8. A method of preparing a dispersion as defined in claim 1 comprising dispersing metal, metal oxide or metal precursor particles in the presence of the polymeric dispersant in a dispersion medium.

9. The method of preparing a dispersion comprising metallic, metal oxide or metal precursor nanoparticles according to claim 8, wherein the dispersion medium is 1-methoxy-2-propanol, methanol, ethanol, isopropanol or a combination thereof.

10. A method of preparing a dispersion comprising metallic nanoparticles according to claim 1 by an in-situ reduction under mixing of a metal precursor, a metal oxide, a metal salt or a combination thereof, in the presence of a reducing agent, the polymeric dispersant and the dispersion medium.

11. A polymeric dispersant comprising an anchor group with affinity for metallic, metal oxide or metal precursor nanoparticles that is chemically bonded to a polymeric backbone and wherein the polymeric dispersant has a 95 wt % decomposition at a temperature below 300° C. as measured by Thermal Gravimetric Analysis, wherein the polymeric backbone is according to Formula I,

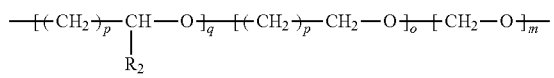

Formula I wherein m is an integer between 1 and 500, o is an integer between 0 and 340, q is an integer between 0 and 250, p is an integer between 1 and 7, m+o+q is an integer between 14 and 500, and $R_2$ represents hydrogen, a methyl or an optionally substituted alkyl group, wherein the anchor group is according to Formula II, III, IV or V,

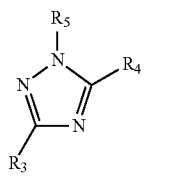

Formula II

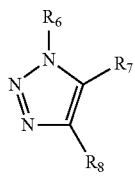

Formula III

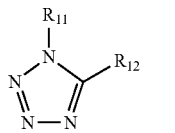

Formula IV

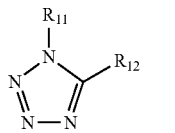

Formula V wherein $R_3$, $R_4$, $R_7$, $R_8$, $R_9$, $R_{10}$, and $R_{12}$ independently represent a halogen, an optionally substituted thiol, a hydroxyl, a carboxylic acid, an aldehyde, an ester, an amide, a primary amine, a secondary amine, a tertiary amine, an optionally substituted alkyl, aryl, aralkyl or alkylene group;

$R_7$ and $R_8$ can be optionally linked and form a ring structure;

$R_5$, $R_6$, and $R_{11}$ represent independently a halogen, an optionally substituted thiol, a carboxylic acid, a primary amine, a secondary amine, a tertiary amine, an optionally substituted alkyl, aryl or aralkyl group;

X independently represents a —N—, a —CH—, or a —C($CR_{13}$)— and where $R_{13}$ represents a methyl, an optionally substituted alkyl, aryl or aralkyl group and where X can optionally be linked to $R_9$ or $R_{10}$ and form a ring structure; and Y represents oxygen, sulfur, or —$NR_{14}$—, wherein $R_{14}$ represents a methyl, an optionally substituted alkyl, aryl or aralkyl group.

12. A method of preparing the polymeric dispersant according to claim 11 by a reaction between:

90 to 99.4 mol % of a monomer represented by Formula VI, VII or VIII, or a combination thereof;

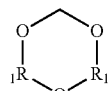

Formula VI

Formula VII

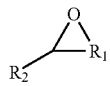

Formula VIII wherein $R_1$ represents a $(CH_2)_p$ unit with p is an integer between 1 and 7 and $R_2$ represents hydrogen, a methyl or an optionally substituted alkyl group, 0.1 to 10 mol % of an anchor group according to Formulae II, III, IV, or V, or a combination thereof; and 0.1 to 0.5 mol % of a polymerization initiator selected from the group of a proton acid, a Lewis acid, an oxonium compound, or an anionic initiator selected from the group consisting of an alcoholate and an organometallic compound.

13. A printing fluid prepared from the dispersion defined in claim 1 and having a viscosity at jetting temperature between 5 and 20 mPa·s.

14. A method of preparing a metallic layer or pattern comprising printing the dispersion according to claim 1 on a substrate followed by sintering at a temperature below 300° C.

15. A printing fluid prepared from the paste defined in claim 7 and having a viscosity at jetting temperature between 5 and 20 mPa·s.

* * * * *